E. WOLF.
MICROMETER.
APPLICATION FILED MAR. 6, 1919.

1,331,794.  Patented Feb. 24, 1920.

INVENTOR:
Emile Wolf
By Wm Wallace White
ATT'Y.

UNITED STATES PATENT OFFICE.

EMILE WOLF, OF LA CHAUX-DE-FONDS, SWITZERLAND.

MICROMETER.

1,331,794.   Specification of Letters Patent.   Patented Feb. 24, 1920.

Application filed March 6, 1919. Serial No. 281,093.

*To all whom it may concern:*

Be it known that I, EMILE WOLF, a citizen of the Swiss Republic, residing at 13 Montbrillant, La Chaux-de-Fonds, Canton of Neuchâtel, Switzerland, have invented new and useful Improvements in Micrometers, of which the following is a specification.

My invention relates to micrometers, and particularly to a micrometer having two measuring arms arranged in confronting relation to each other, and between which is placed the article to be measured.

The object of my invention is the provision of a micrometer of the above described character, in which one of the measuring arms is movable in a plane at right angles to the longitudinal axis of the other arm, whereby the arms can be moved into or out of axial alinement.

I will describe one form of micrometer embodying my invention, and will then point out the novel features thereof in claim.

In the accompanying drawings.

Figure 3:
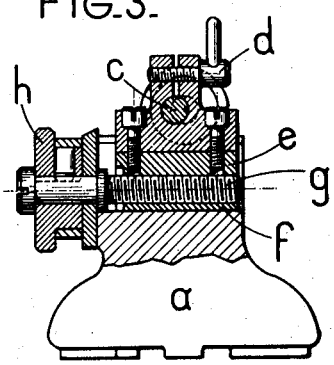
Fig. 3 is a sectional view taken on the line 3—3 of Fig. 2.

Referring to the drawings, the micrometer herein shown comprises a U-shaped frame, upon the ends of which are mounted measuring arms $b$ and $c$. The arm $b$ comprises a micrometric spiral, which is for the purpose of adjusting the arm toward or away from the article to be measured, and to measure the distance between the confronting ends of the arms. The arm $c$ comprises a rod fixed on a sliding carriage $e$ by means of a tightening screw $d$. The carriage $e$ is mounted for sliding movement within an opening $f$ formed in frame $a$, and is controlled by a micrometric spiral $g$ through the medium of a serrated button $h$ fixed to the spiral by means of a key, as shown in Fig. 3.

In the foregoing construction it will be evident that the arm $c$ can be displaced perpendicularly with respect to the micrometric spiral $b$, so that the arms $b$ and $c$ can be moved into or out of axial alinement.

Figure 1:
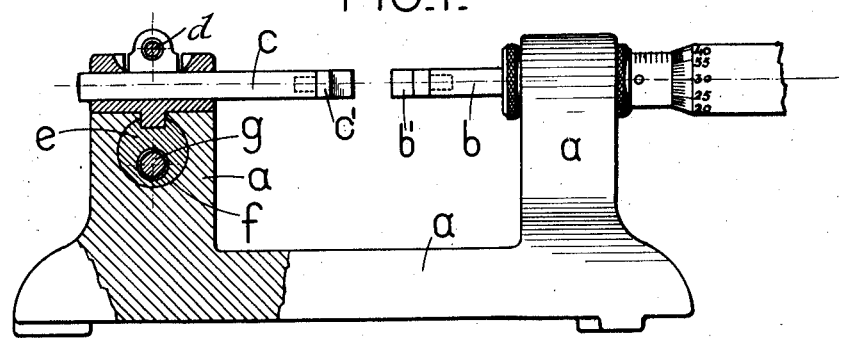
Figure 1 is a view showing in front elevation, and partially in section, one form of micrometer embodying my invention.
Figure 2:
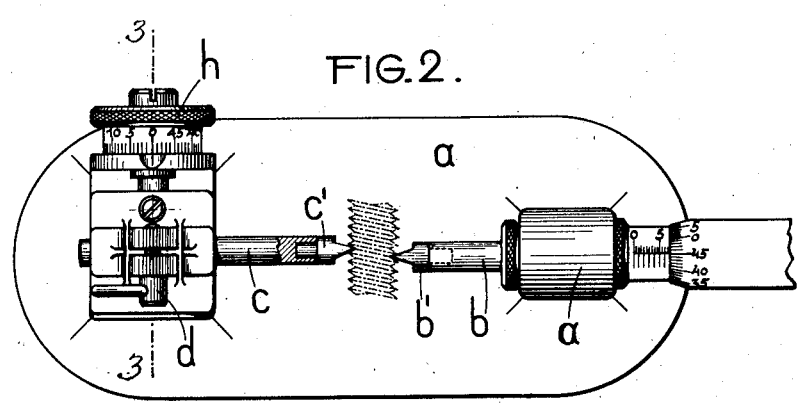
Fig. 2 is a view showing in top plan the micrometer shown in Fig. 1, and a screw interposed between the measuring arms to illustrate the manner in which the arms are used.

By this arrangement I produce a micrometer which measures with ease the diameter of the deepest point or bottom of a filleted cylinder, such as shown in Fig. 2. This measuring may be effected irrespective of the inclination or angle of the threads.

The distance between the vertical planes that pass through the axes of the two arms $b$ and $c$ can be readily determined by means of the micrometric divisions provided upon the button $h$. Each of the arms $b$ and $c$ is provided with a contact point $b'$ and $c'$ respectively, which is removable to permit the ready substitution of other points having forms which are appropriate for the article to be measured. As shown in the drawing, the inner end of each arm $b$ and $c$ is formed with a socket which receives the movable contact point $b'$ and $c'$, and which retains the same therein by frictional engagement with the walls of the socket.

Although I have herein shown and described only one form of micrometer embodying my invention, it is to be understood that various changes and modifications may be made without departing from the spirit of the invention, and the spirit and scope of the appended claim. It is considered within the scope of this invention to provide a micrometer in which one of the measuring arms is fixed, while the other arm, formed with the micrometric spiral, is movable perpendicularly to the axis of the spiral.

What I claim is:

A micrometer comprising a U-shaped frame, a measuring arm carried by one parallel portion of said frame and having micrometric means for moving it longitudinally therethrough, the other parallel portion being formed with an opening, a carriage slidable in said opening and at right angles to the movement of the measuring arm, a shank threadedly engaging said carriage and adapted to move the latter when rotating, a clamp detachably secured to said carriage and movable therewith, and a second measuring arm carried by said clamp and adjustable longitudinally therein, the last mentioned arm being disposed longitudinally of the first arm.

In testimony whereof I have signed my name to this specification.

EMILE WOLF.

Witnesses:
N. J. HEHLIN,
A. O. WHANG.